US006650234B1

(12) United States Patent
Soto

(10) Patent No.: US 6,650,234 B1
(45) Date of Patent: Nov. 18, 2003

(54) VEHICULAR ANTI-THEFT SYSTEM WITH BRAKE LINE VALVE

(76) Inventor: Robert D. Soto, 1555 W. Grand St., Pomona, CA (US) 91760

( * ) Notice: Subject to any disclaimer, the term of this patent is extended or adjusted under 35 U.S.C. 154(b) by 76 days.

(21) Appl. No.: 09/835,669

(22) Filed: Apr. 16, 2001

Related U.S. Application Data

(63) Continuation-in-part of application No. 09/516,679, filed on Mar. 1, 2000, now abandoned.

(51) Int. Cl.[7] .................................................. B60R 1/00
(52) U.S. Cl. ........................ 340/426; 340/438; 340/452; 340/463; 180/287
(58) Field of Search ................................ 340/426, 429, 340/438, 450.1, 452, 439, 463; 307/10.3, 10.4, 10.2, 180; 180/287, 347

(56) References Cited

U.S. PATENT DOCUMENTS 3,800,279 A * 3/1974 Thompson .................. 137/598
4,691,801 A * 9/1987 Mann et al. ................. 180/287
4,754,255 A * 6/1988 Sanders et al. ............. 180/287
5,570,756 A * 11/1996 Hatcher ....................... 180/287

* cited by examiner

*Primary Examiner*—Daniel J. Wu
*Assistant Examiner*—Son Tang
(74) *Attorney, Agent, or Firm*—Edward P. Dutkiewicz

(57) ABSTRACT

A vehicular anti-theft system with brake line valve including a valve mechanism connected to the plurality of brake lines between a master cylinder and the associated brakes of a vehicle. The valve mechanism includes a housing with a solenoidal valve therein associated with the brake lines. The solenoidal valve has a first orientation with the solenoidal valve preventing control of the brakes by the master cylinder. The solenoidal valve further has a second orientation with the solenoidal valve thereby allowing control of the brakes by the master cylinder. The solenoidal valve includes a relay adapted to transfer between the first orientation upon and the second orientation. The solenoidal valve is adapted remain in a present orientation thereof without consuming power. Lastly, control circuitry is connected to the valve mechanism.

1 Claim, 5 Drawing Sheets

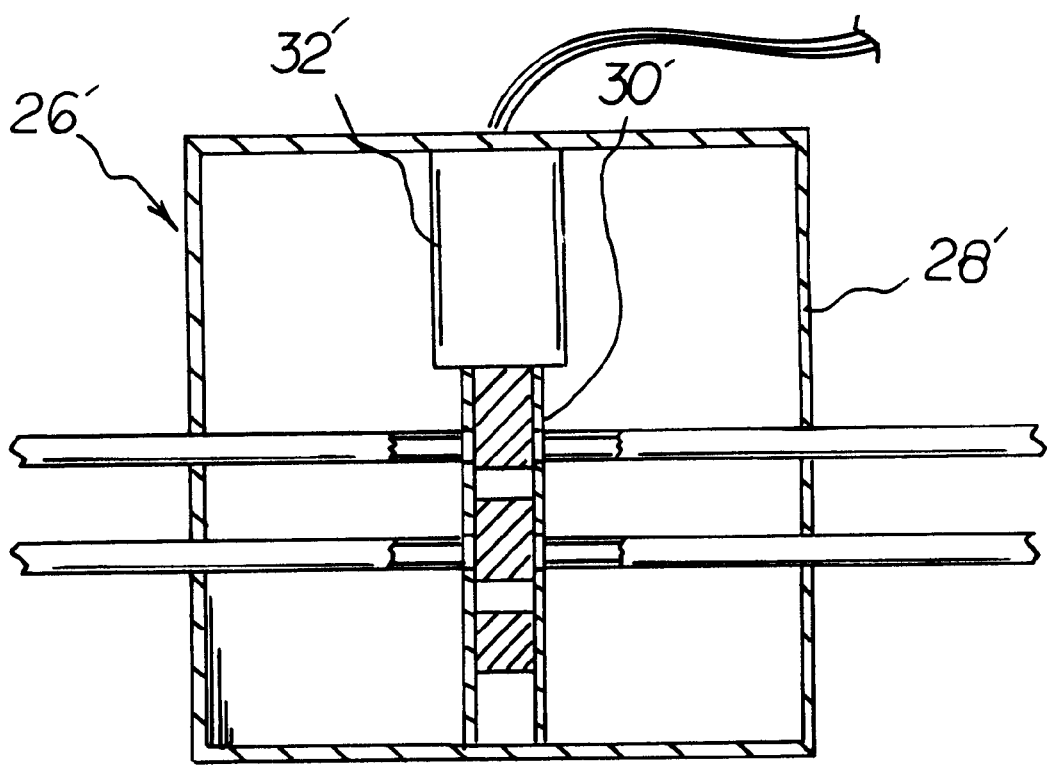

US 6,650,234 B1

VEHICULAR ANTI-THEFT SYSTEM WITH BRAKE LINE VALVE

RELATED APPLICATION

The present application is a continuation in part of U.S. patent application Ser. No. 09/516,679, filed Mar. 1, 2000, now abandoned.

BACKGROUND OF THE INVENTION

1. Field of the Invention

The present invention relates to a vehicular anti-theft system with brake line valve and more particularly pertains to preventing the theft of a vehicle with a unique method of controlling a valve of an associated brake line.

2. Description of the Prior Art

The use of vehicle anti-theft devices is known in the prior art. More specifically, vehicle anti-theft devices heretofore devised and utilized for the purpose of preventing vehicle theft are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,431,487 to Poricelli; U.S. Pat. No. 4,721,192 to Cano et al.; U.S. Pat. No. 5,392,876 to Linares; U.S. Pat. No. 4,633,686 to Carr; U.S. Pat. No. 4,934,492 to Hayes-Sheen; and U.S. Pat. No. 5,154,493 to Futrell et al.

In this respect, the vehicular anti-theft system with brake line valve according to the present invention substantially departs from the conventional concepts and designs of the prior art, and in so doing provides an apparatus primarily developed for the purpose of preventing the theft of a vehicle with a unique method of controlling a valve of an associated brake line.

Therefore, it can be appreciated that there exists a continuing need for a new and improved vehicular anti-theft system with brake line valve which can be used for preventing the theft of a vehicle with a unique method of controlling a valve of an associated brake line. In this regard, the present invention substantially fulfills this need.

SUMMARY OF THE INVENTION

In view of the foregoing disadvantages inherent in the known types of vehicle anti-theft devices now present in the prior art, the present invention provides an improved vehicular anti-theft system with brake line valve. As such, the general purpose of the present invention, which will be described subsequently in greater detail, is to provide a new and improved vehicular anti-theft system with brake line valve which has all the advantages of the prior art and none of the disadvantages.

To attain this, the present invention essentially comprises a vehicle having a master cylinder, and a brake pedal. Further included as components of the vehicle are a pair of front brakes connected to the master cylinder via at least one front brake line and a pair of rear brakes connected to the master cylinder via at least one rear brake line. Note FIG. 3. By this structure, the master cylinder is adapted to increase the pressure in the brake lines upon the depression of the brake pedal thereby actuating the front and rear brakes. Further provided is an alarm system comprising a first relay connected to a horn and a set of lights of the vehicle, as shown in FIG. 1. The first relay is adapted to actuate the horn and set of lights only during the receipt of an alarm signal. The alarm system further has a second relay adapted to preclude normal operation of a starter of the vehicle only during the receipt of the alarm signal. Next provided is a valve mechanism connected to the front and rear brake lines between the master cylinder and the front and rear brakes. As shown in FIG. 4, the valve mechanism includes a housing with a solenoidal valve associated with all the brake lines. The solenoidal valve has a first orientation for precluding the change of pressure within the brake lines between the brakes and solenoidal valve. This prevents control of the brakes by the master cylinder. The solenoidal valve further has a second orientation for allowing the change of pressure within the brake lines between the brakes and solenoidal valve, thereby allowing control of the brakes by the master cylinder. The solenoidal valve has a relay adapted to transfer the solenoidal valve to the first orientation thereof upon the receipt of a close valve signal. A separate relay is included that is adapted to transfer the solenoidal valve to the second orientation thereof upon the receipt of an open valve signal. It should be noted that upon the lack of receipt of the open and close valve signals, the solenoidal valve is adapted remain in a present orientation thereof without consuming power. As shown in FIG. 5, a key pad is included. Such keypad is situated within an interior space of the vehicle. The key pad includes a plurality of numeric keys adapted to transmit a sequential numeric code sequence upon the sequential depression thereof. A reset key is included for transmitting a reset signal upon the depression thereof. Also included is an arm key adapted to transmit an arm signal upon the depression thereof. Situated on the front face of the keypad is a red light emitting diode for emitting a red light upon the actuation thereof. Associated therewith is a green light emitting diode for emitting a green light upon the actuation thereof. Finally, control circuitry is connected between the relays of the alarm system, the relays of the valve mechanism, and the keypad. See FIG. 1. In use, the control circuitry has a first mode of operation initiated by the receipt of the arm signal. While in the first mode of operation, the control circuitry is adapted to actuate the red light emitting diode and transmit the close valve signal to the relays of the valve mechanism. The control circuitry further has a second mode of operation initiated by the receipt of a correct numeric code sequence and the subsequent receipt of the reset signal. When in the second mode of operation, the green light emitting diode is actuated and the open valve signal is transmitted to the relays of the valve mechanism. Lastly, the control circuitry further has a third mode of operation initiated by the receipt of an incorrect numeric code sequence and the subsequent receipt of the reset signal, whereupon the alarm signal is transmitted to the alarm system for a predetermined time period. It should be understood that immediately prior to initiating the first mode of operation, a user must depress the brake pedal before depressing the arm button.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular anti-theft system with brake line valve which has all the advantages of the prior art vehicle anti-theft devices and none of the disadvantages.

It is another object of the present invention to provide a new and improved vehicular anti-theft system with brake line valve which may be easily and efficiently manufactured and marketed.

It is a further object of the present invention to provide a new and improved vehicular anti-theft system with brake line valve which is of a durable and reliable construction.

An even further object of the present invention is to provide a new and improved vehicular anti-theft system with brake line valve which is susceptible of a low cost of manufacture with regard to both materials and labor, and which accordingly is then susceptible of low prices of sale to the consuming public, thereby making such vehicular anti-theft system with brake line valve economically available to the buying public.

Still yet another object of the present invention is to provide a new and improved vehicular anti-theft system with brake line valve which provides in the apparatuses and methods of the prior art some of the advantages thereof, while simultaneously overcoming some of the disadvantages normally associated therewith.

Still another object of the present invention is to prevent the theft of a vehicle with a unique method of controlling a valve of an associated brake line.

Lastly, it is an object of the present invention to provide a new and improved vehicular anti-theft system with brake line valve including a valve mechanism connected to at least one of a plurality of brake lines between a master cylinder and the associated brakes of a vehicle. The valve mechanism includes a housing with a solenoidal valve therein associated with all the brake lines. The solenoidal valve has a first orientation for precluding a change of pressure within the brake lines between the brakes and solenoidal valve thereby preventing control of the brakes by the master cylinder. The solenoidal valve further has a second orientation for allowing the change of pressure within the brake lines between the associated brakes and solenoidal valve thereby allowing control of the brakes by the master cylinder. The solenoidal valve includes a relay adapted to transfer the solenoidal valve to the first orientation thereof upon the receipt of a close valve signal and further adapted to transfer the solenoidal valve to the second orientation thereof upon the receipt of an open valve signal. Upon the lack of receipt of the open and close valve signals, the solenoidal valve is adapted remain in a present orientation thereof without consuming power. Lastly, control circuitry is connected to the valve mechanism and has a first mode of operation for transmitting a close valve signal to the relays of the valve mechanism. The control circuitry further has a second mode of operation for transmitting an open valve signal to the relays of the valve mechanism, whereby the modes of operation are user-controlled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an illustration of a valve in accordance with an alternative embodiment of the present invention.

Similar reference characters refer to similar parts throughout the several views of the drawings.

DESCRIPTION OF THE PREFERRED EMBODIMENT

Figure 1:
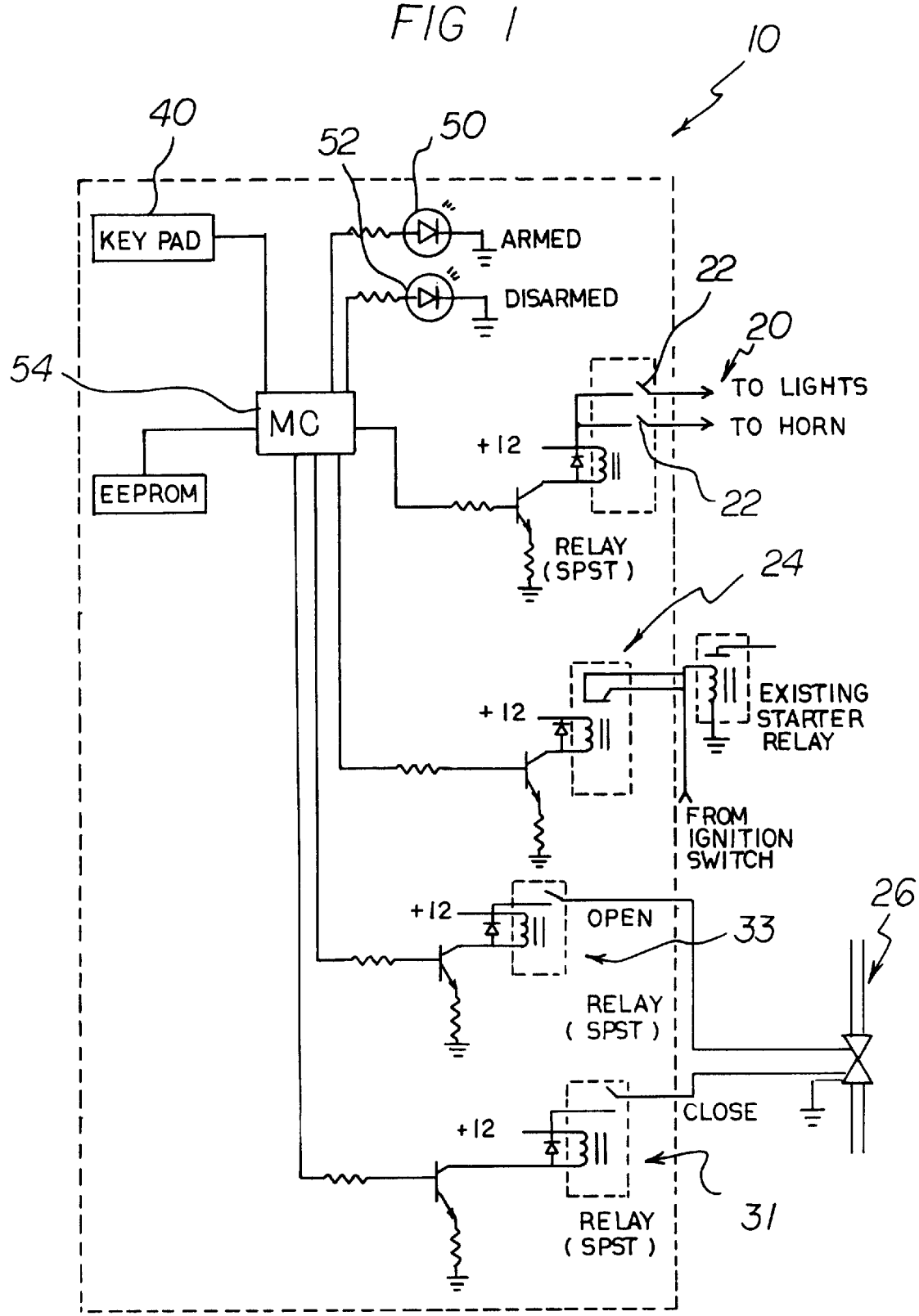
FIG. 1 is an illustration of the preferred embodiment of the vehicular anti-theft system with brake line valve constructed in accordance with the principles of the present invention.
Figure 2:
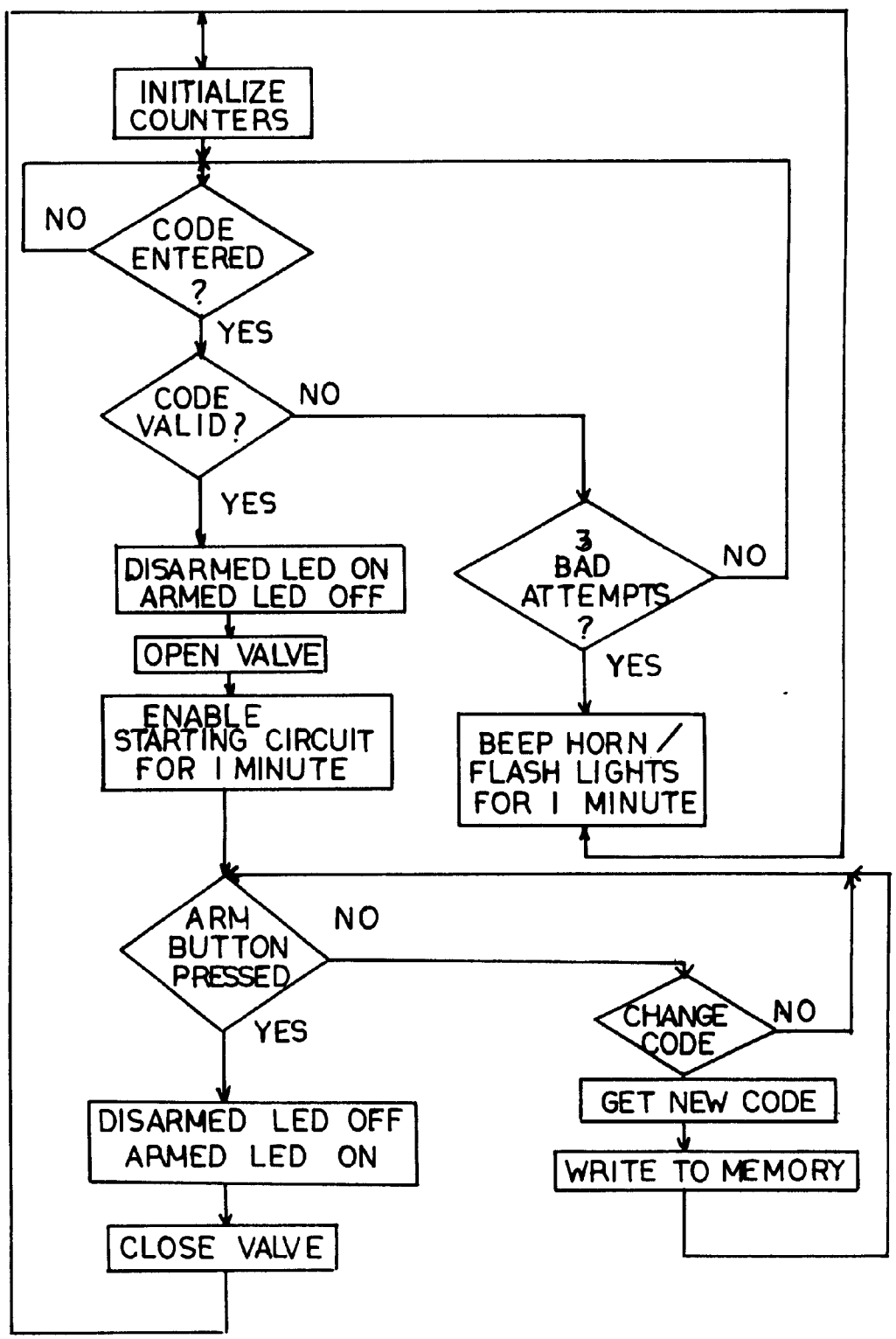
FIG. 2 is a flowchart depicting the function afforded by the control circuitry of the present invention.

With reference now to the drawings, and in particular to FIG. 1 thereof, a new and improved vehicular anti-theft system with brake line valve embodying the principles and concepts of the present invention and generally designated by the reference numeral 10 will be described.

The present invention, the new and improved vehicular anti-theft system with brake line valve, is comprised of a plurality of components. Such components in their broadest context include an alarm system, valve mechanism, keypad, and control circuitry. Such components are individually configured and correlated with respect to each other so as to attain the desired objective.

Figure 3:
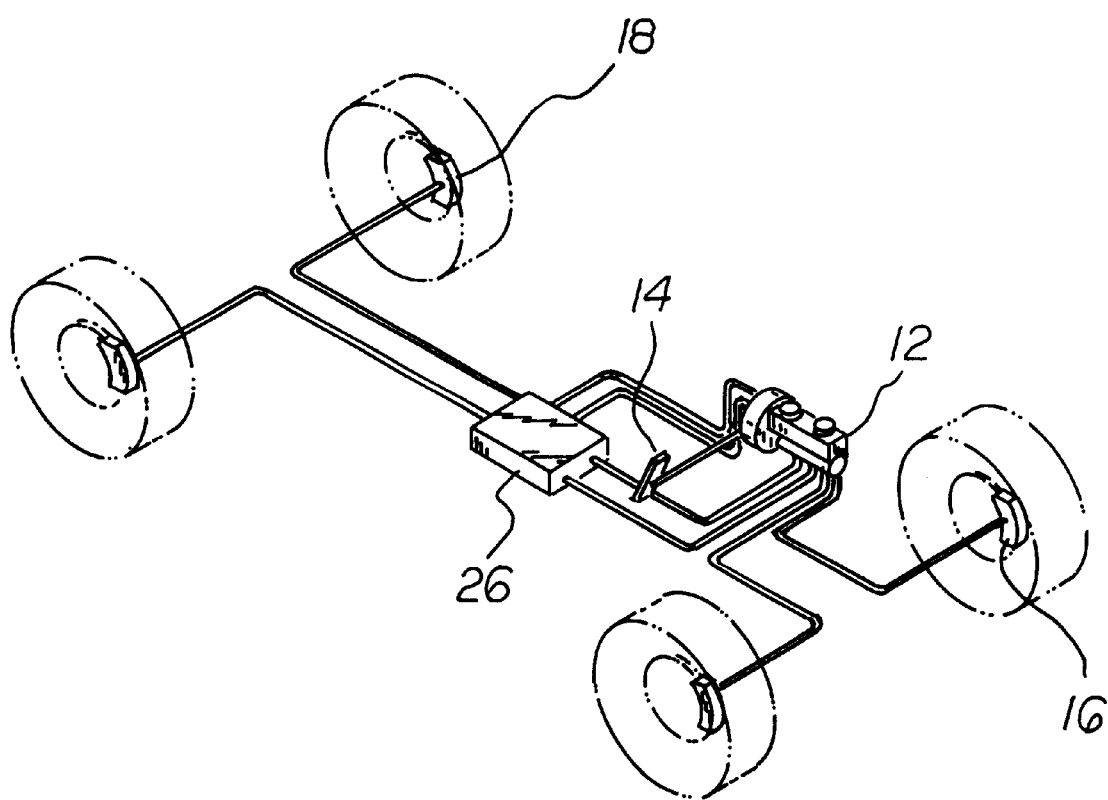
FIG. 3 is a perspective view of the interconnection of the valve mechanism of the present invention with the various components of the vehicle.

More specifically, it will be noted that the system 10 of the present invention includes a vehicle having a master cylinder 12, and a brake pedal 14. Further included as components of the vehicle are a pair of front brakes 16 connected to the master cylinder via at least one front brake line and a pair of rear brakes 18 connected to the master cylinder via at least one rear brake line. Note FIG. 3. By this structure, the master cylinder is adapted to increase the pressure in the brake lines upon the depression of the brake pedal thereby actuating the front and rear brakes.

Further provided is an alarm system 20 comprising a first relay 22 connected to a horn and a set of lights of the vehicle, as shown in FIG. 1. The first relay is adapted to actuate the horn and set of lights only during the receipt of an alarm signal. The alarm system further has a second relay 24 adapted to preclude normal operation of a starter of the vehicle only during the receipt of the alarm signal.

Figure 4:
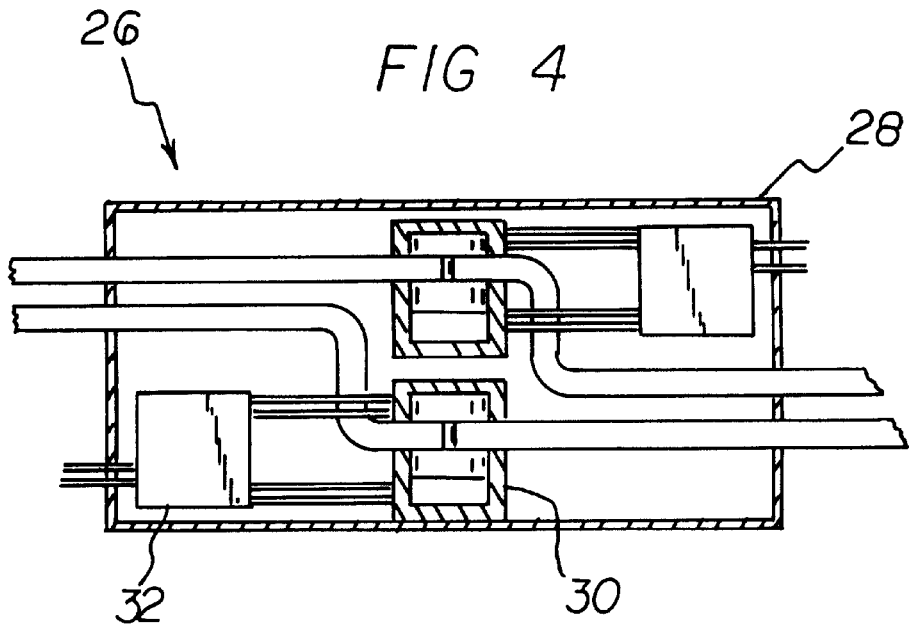
FIG. 4 is a cross-sectional view of the housing of the valve mechanism and the components situated therein.

Next provided is a valve mechanism 26 connected to the front and rear brake lines between the master cylinder and the front and rear brakes. As shown in FIG. 4, the valve mechanism includes a housing 28 with a solenoidal valve 30 associated with all brake line. Each solenoidal valve has a first orientation for precluding the change of pressure within the brake line between the associated brakes and solenoidal valve. This prevents control of the associated brakes by the master cylinder. The solenoidal valve further has a second orientation for allowing the change of pressure within the associated brake line between the associated brakes and solenoidal valve, thereby allowing control of the associated brakes by the master cylinder. The solenoidal valves each have an associated relay 31 adapted to transfer the corresponding solenoidal valve to the first orientation thereof upon the receipt of a close valve signal. Such relay resides within a relay housing 32. Also in such relay housing is a separate relay 33 that is adapted to transfer the corresponding solenoidal valve to the second orientation thereof upon the receipt of an open valve signal. It should be noted that upon the lack of receipt of the open and close valve signals, the solenoidal valve is adapted remain in a present orientation thereof without consuming power. As shown in FIG. 1, each relay has a transistor associated therewith for switching purposes. Also, a diode is connected to the coils of each relay.

Figure 5:
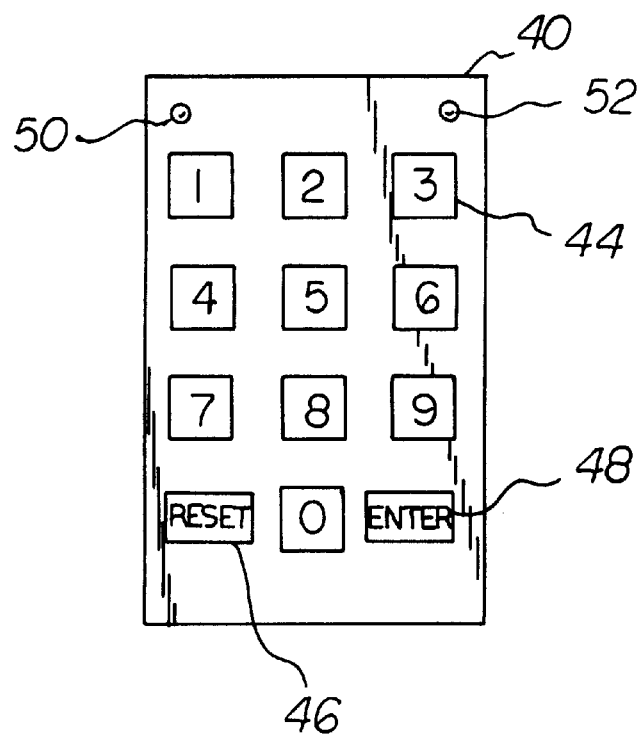
FIG. 5 is a front elevational view of the keypad of the present invention.

As shown in FIG. 5, a key pad 40 is included. Such keypad is situated within an interior space of the vehicle. The key pad includes a plurality of numeric keys 44 adapted to transmit a sequential numeric code sequence upon the sequential depression thereof. A reset key 46 is included for transmitting a reset signal upon the depression thereof. Also included is an arm key 48 adapted to transmit an arm signal upon the depression thereof. Situated on the front face of the keypad is a red light emitting diode 50 for emitting a red light upon the actuation thereof. Associated therewith is a green light emitting diode 52 for emitting a green light upon the actuation thereof.

Control circuitry 54 is connected between the relays of the alarm system, the relays of the valve mechanism, and the keypad. See FIG. 1. Preferably, the control circuitry is contained within the housing of the valve mechanism. In use, the control circuitry has a first mode of operation initiated by the receipt of the arm signal. While in the first mode of operation, the control circuitry is adapted to actuate the red light emitting diode and transmit the close valve signal to the relays of the valve mechanism. It should be understood that immediately prior to initiating the first mode of operation, a user must depress the brake pedal before to depressing the arm button. While not shown, the control circuitry may be directly connected to the ignition switch for precluding the recognition of the arm signal when the ignition switch is actuated. This would provide a safety feature. The control circuitry further has a second mode of operation initiated by the receipt of a correct numeric code sequence and the subsequent receipt of the reset signal. When in the second mode of operation, the green light emitting diode is actuated and the open valve signal is transmitted to the relays of the valve mechanism.

Lastly, the control circuitry has a third mode of operation initiated by the receipt of an incorrect numeric code sequence and the subsequent receipt of the reset signal, whereupon the alarm signal is transmitted to the alarm system for a predetermined time period. In the preferred embodiment, such predetermined amount of time is 1 minute. Also in the preferred embodiment, the control circuitry will not switch to the third mode of operation until the receipt of an incorrect numeric code sequence and the subsequent receipt of the reset signal three consecutive times.

As an option, the control circuitry may be adapted to only stop the transmission of the alarm signal to the ignition switch for one minute upon the initiation of the second mode of operation. This would allow the present invention to function as anti-theft device even if a user fails to transfer the control circuitry to the first mode of operation.

The present invention further includes an EEPROM memory chip for allowing the correct numerical code sequence to be changed. The control circuitry only allows the code to be changed while it is in the second mode of operation. To accomplish such, a previous correct numerical code sequence is entered followed by a predetermined change code numerical sequence which is, in turn, is followed by a new correct numerical code sequence. Thereafter, the previous correct numerical code sequence becomes an incorrect numerical code sequence.

In an alternate embodiment, the keypad is connected to the control circuitry by a transmitter/receiver combination thereby allowing a user to control the present invention from afar.

In a further alternative embodiment, as shown in FIG. 6, the four solenoids, one associated with each break line, are replaced by a single solenoid associated with all the break lines. The four brake lines are coupled to a single solenoid valve such that all the brake line can be made operative or inoperative by the action of this signal solenoid valve.

More specifically a valve mechanism 26' is connected to the front and rear brake lines between the master cylinder and the front and rear brakes. As shown in FIG. 6, the valve mechanism includes a housing 28' with a solenoidal valve 30' associated with all brake line. The solenoidal valve has a first orientation for precluding the change of pressure within the brake line between the associated brakes and solenoidal valve. This prevents control of the associated brakes by the master cylinder. The solenoidal valve further has a second orientation, not shown, for allowing the change of pressure within the associated brake line between the associated brakes and the solenoidal valve, thereby allowing control of the associated brakes by the master cylinder. As shown in FIG. 1, the solenoidal valve has an associated relay 31 adapted to transfer the solenoidal valve to the first orientation thereof upon the receipt of a close valve signal. Such relay resides within a relay housing 32'. Also in such relay housing is a separate relay that is adapted to transfer the solenoidal valve to the second orientation thereof upon the receipt of an open valve signal. It should be noted that upon the lack of receipt of the open and close valve signals, the solenoidal valve is adapted remain in a present orientation thereof without consuming power. As shown in FIG. 1, the relay has a transistor associated therewith for switching purposes. Also, a diode is connected to the coils of the relay.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular anti-theft system with brake line valve comprising, in combination:

a vehicle having a master cylinder, a brake pedal, a pair of front brakes connected to the master cylinder via at least one front brake line, and a pair of rear brakes connected to the master cylinder via at least one rear brake line, whereby the master cylinder is adapted to increase the pressure in the brake lines upon the depression of the brake pedal thereby actuating the front and rear brakes;

an alarm system comprising a first relay connected to a horn and a set of lights of the vehicle, the first relay adapted to actuate the horn and set of lights only during the receipt of an alarm signal, the alarm system further having a second relay adapted to preclude normal operation of a starter of the vehicle only during the receipt of the alarm signal;

a valve mechanism connected to the front and rear brake lines between the master cylinder and the front and rear brakes, the valve mechanism having a housing with a four solenoidal valves, one associated with each brake line, each solenoidal valve having a first orientation for precluding the change of pressure within the associated brake line between the associated brakes and solenoidal valve thereby preventing control of the associated brakes by the master cylinder and a second orientation for allowing the change of pressure within the associated brake line between the associated brakes and solenoidal valve thereby allowing control of the associated brakes by the master cylinder, the solenoidal valves each having an associated relay adapted to transfer the corresponding solenoidal valve to the first orientation thereof upon the receipt of a close valve signal and further adapted to transfer the corresponding solenoidal valve to the second orientation thereof upon the receipt of an open valve signal, whereby upon the lack of receipt of the open and close valve signals, the solenoidal valve is adapted remain in a present orientation thereof without consuming power;

a key pad situated within an interior space of the vehicle, the key pad including a plurality of numeric keys adapted to transmit a sequential numeric code sequence upon the sequential depression thereof, a reset key adapted to transmit a reset signal upon the depression thereof, an arm key adapted to transmit an arm signal upon the depression thereof, a red light emitting diode situated on a front face thereof for emitting a red light upon the actuation thereof, and a green light emitting diode situated on a front face thereof for emitting a separate green light upon the actuation thereof; and control circuitry coupled between the relays of the alarm system, the relays of the valve mechanism, and the keypad, the control circuitry having a first mode of operation initiated by the receipt of the arm signal whereupon the red light emitting diode is actuated and the close valve signal is transmitted to the relays of the valve mechanism, the control circuitry further having a second mode of operation initiated by the receipt of a correct numeric code sequence and the subsequent receipt of the reset signal whereupon the green light emitting diode is actuated and the open valve signal is transmitted to the relays of the valve mechanism, the control circuitry further having a third mode of operation initiated by the receipt of an incorrect numeric code sequence and the subsequent receipt of the reset signal whereupon the alarm signal is transmitted to the alarm system for a predetermined time period, whereby a user depresses the brake pedal prior to depressing the arm button.

* * * * *